Figure 5:
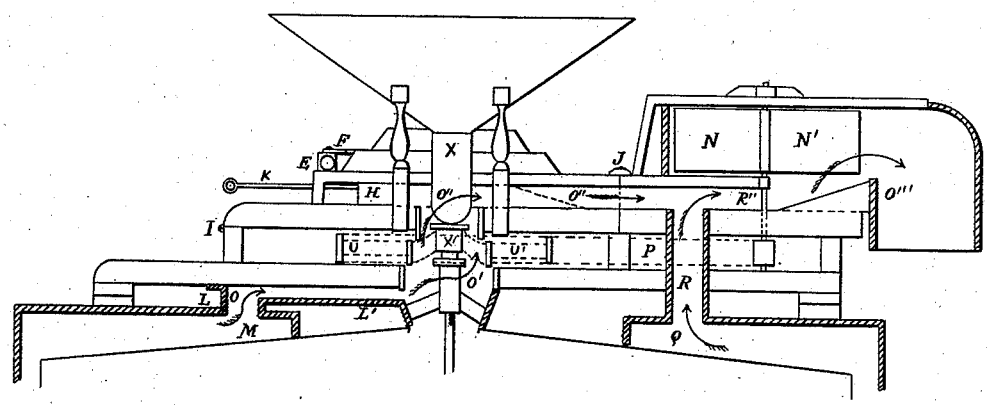
Figure 6:
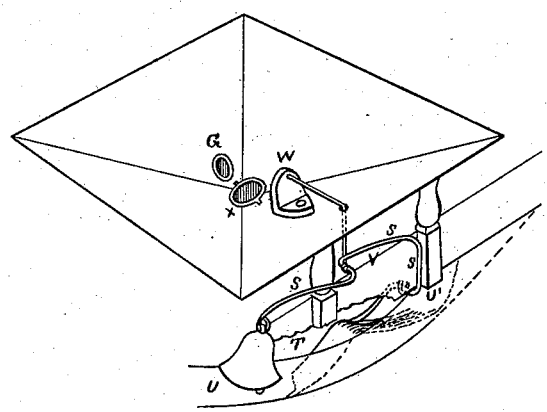

2 Sheets—Sheet 1.
M. K. JONES.
GRAIN-CLEANER AND MILLSTONE EXHAUST.
No. 194,439. Patented Aug. 21, 1877.
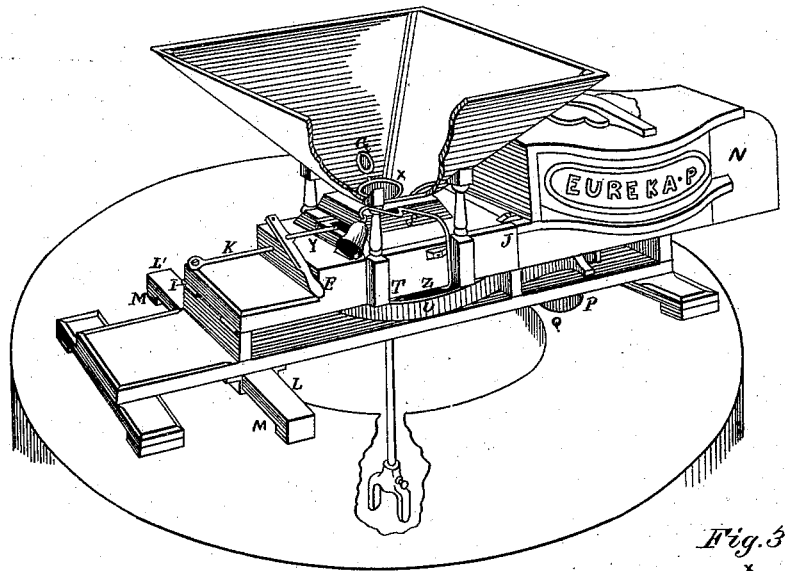
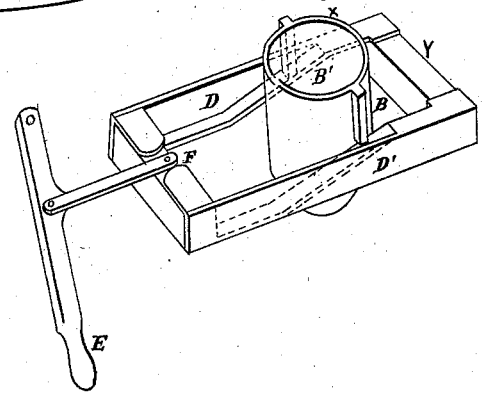
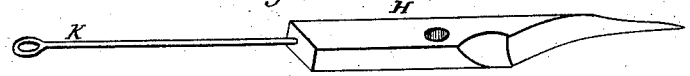
WITNESSES
INVENTOR
Martin K. Jones,
ATTORNEYS 2 Sheets—Sheet 2.

M. K. JONES.
GRAIN-CLEANER AND MILLSTONE EXHAUST.

No. 194,439. Patented Aug. 21, 1877.

WITNESSES
Henry N. Miller
H. W. Throckmorton

INVENTOR
Martin K. Jones,
Alexander T. Mason
ATTORNEYS.

N. PETERS, PHOTO-LITHOGRAPHER, WASHINGTON, D. C.

UNITED STATES PATENT OFFICE.

MARTIN K. JONES, OF DUBUQUE, IOWA.

IMPROVEMENT IN GRAIN-CLEANER AND MILLSTONE-EXHAUST.

Specification forming part of Letters Patent No. 194,439, dated August 21, 1877; application filed December 13, 1876.

*To all whom it may concern:*

Be it known that I, MARTIN K. JONES, of Dubuque, State of Iowa, have invented a silent centrifugal feeder and grain-separator, millstone-cooler, and steam-condenser, (being the several parts contained in the machine hereinafter described,) of which the following is a specification:

My invention consists of two peculiar constructions to regulate the flow of grain from the hopper to the millstone, and of two additional attachments, the one consisting of a steam-condenser or millstone-cooler, and the other of an alarm to signify when the hopper needs replenishing; and also in the manner of obtaining access to the interior of the machine for repairs or observation.

Figure 1 of the accompanying drawings represents a perspective view of the whole machine, with a part of the hopper and curb broken away, as improved. Fig. 2 represents feed-cup X, situated as shown at X, Fig. 1, with parallel projections A A' upon each side, having each diagonal slots B B' through them. Fig. 3 exhibits the feed-gate Y, with mode of operating feed-cup X.

Said gate Y consists of a frame-work of wood and iron, having two inclined-plane projections, D D', substantially as represented, which the feed-cup X rests and slides up and down upon by means of the diagonal slots B B', the up-and-down movement being produced by the position of the lever or handle E, which is connected with said frame at F. The feed-cup X, being and continuing in place, as shown in Fig. 1, and when closed resting upon a cap, X', Fig. 5, can be raised and lowered at will by means of the said lever, the inclined planes causing it to rise in its place, thereby permitting a freer flow of grain, or lowering it, thus checking the quantity of the outflow.

The object of the tube whose opening into the hopper is seen at G, Fig. 1, is to permit grain to fall into the eye of the millstone independent of the feed-movement, and whether the stone is in operation or not, thereby obviating the difficulty of being without any grain upon the stone in starting motion. It is operated by means of the valve H, having a handle, K; and when intended to be used open, the block H is pushed to its proper place, directly under and connecting with the tube, having its opening G, Fig. 1, in the hopper, said tube or opening continuing through to the surface of the stone, and allowing the grain to fall into the eye of it. When desired closed, the block or valve H is drawn back, the continuation of the block closing or cutting off the passage-way above described.

The attachment for a millstone-cooler and steam-condenser is represented at one end of the machine, Figs. 1 and 5, by the air-conductors L L', connecting with and opening into the millstone-curb at opposite sides M M', Fig. 1, and in Fig. 5 (where but one side is shown) at M, and by means of the fans N N' the moist and heated air within the curb and immediately surrounding the stone is, without any additional expense or machinery, drawn through the conductors described into the general air-passage, designated by darts O O' O'' O''', and so to the outer air. At the opposite end the air-conductor P, opening into the millstone-curb at Q, affords egress for the moist and heated air in that quarter, which is drawn up in the direction of the darts R R'' O''' by means of the aforesaid fans, and in the manner described.

As a result, the flour bolts more freely, the stone is rendered cooler, and the curb is made to last longer.

The alarm attachment consists of a bell attached to a strong and stiff wire, S, bent, and having the other end, Z, arranged to slide upon a cam, T, which is fixed to the inner side of the driving-wheel U U', substantially in the manner set forth and represented. The wire S is connected at the bend V, by means of a cord, with the flexible leather valve W, situated within and on one side of the hopper, immediately above the feed-cup X. When the hopper is amply supplied, the downward pressure of the grain keeps the leather flattened, thereby holding the end of the wire Z clear of the cam. When the pressure is removed by the feeding out of the grain, the end of the wire Z comes in contact with the cam T, causing the bell to sound the alarm on each successive revolution of the wheel, thus giving due notice of the condition of the grain in the hopper.

By means of the hinges at I that portion of the machine embracing the hopper and the adjacent and connecting parts contained within the hinges at I and the joint at J can be raised, and access thereby obtained to examine into its working order, or for the purposes of its repair.

What I claim as my invention, and desire to secure by Letters Patent, is—

1. The two parallel bars or projections on each side of the feed-cup, with diagonal slots through the same, in combination with the inclined planes of the feed-gate, constructed and operated substantially as herein set forth.

2. The tube having its opening in the hopper adjacent to the feed-cup, in combination with the valve for operating the same, substantially as herein described, having for its object the supplying of grain to the stone independent of the feed movement or motion of the stone.

3. The combination, with the millstone-curb, of the air-conductors L L', opening into the curb at M M', the fans N N', general air-passage O, and the air-conductor P at the opposite end, all arranged substantially as and for the purposes herein set forth.

4. The combination, with the alarm-bell, of the wire S, with bent end Z, the wheel U U', with cam T, the connecting-cord, and the flexible leather W, all constructed and arranged to operate substantially as and for the purposes herein set forth.

MARTIN K. JONES.

Witnesses:
ALEX. SIMPLOT,
FRED. O'DONNELL.